United States Patent
Ernst et al.

(10) Patent No.: US 10,207,681 B2
(45) Date of Patent: Feb. 19, 2019

(54) WIPER DEVICE AND METHOD FOR CONTROLLING SAME

(71) Applicant: Robert Bosch GmbH, Stuttgart (DE)

(72) Inventors: Waldemar Ernst, Vaihingen/Enz (DE); Godelieve Kraemer, Huegelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 215 days.

(21) Appl. No.: 14/758,556

(22) PCT Filed: Dec. 10, 2013

(86) PCT No.: PCT/EP2013/076105
§ 371 (c)(1),
(2) Date: Jun. 29, 2015

(87) PCT Pub. No.: WO2014/102060
PCT Pub. Date: Jul. 3, 2014

(65) Prior Publication Data
US 2015/0353058 A1    Dec. 10, 2015

(30) Foreign Application Priority Data
Dec. 28, 2012   (DE) .................. 10 2012 224 478

(51) Int. Cl.
*B60S 1/08*   (2006.01)
*B60S 1/48*   (2006.01)
(Continued)

(52) U.S. Cl.
CPC .......... *B60S 1/0862* (2013.01); *B60S 1/0866* (2013.01); *B60S 1/485* (2013.01); *G05B 5/00* (2013.01);
(Continued)

(58) Field of Classification Search
CPC .... H02P 23/12; H02P 6/12; H02P 1/04; H02P 3/00; H02P 361/24; H02P 7/00;
(Continued)

(56) References Cited

U.S. PATENT DOCUMENTS 6,184,642 B1 * 2/2001 Ausiello ............... B60S 1/0818
318/443
6,369,358 B1 * 4/2002 Blessing ................ B60S 1/048
219/203

(Continued)

FOREIGN PATENT DOCUMENTS

CN    1183081 A    5/1998
CN    1387485 A    12/2002
(Continued)

OTHER PUBLICATIONS

FR2789034 A1, Aug. 4, 2000, Deberne et al. Machine Translation from Espacenet.*

(Continued)

*Primary Examiner* — Sharidan Carrillo
(74) *Attorney, Agent, or Firm* — Michael Best & Friedrich LLP

(57) ABSTRACT

The invention relates to a method for controlling a wiper device (10) by means of a control and/or regulating unit (12). At least one operating parameter is set dependent on at least one parameter which differs from a vehicle window coverage parameter.

11 Claims, 2 Drawing Sheets

(51) Int. Cl.
| | |
|---|---|
| H02P 23/12 | (2006.01) |
| H02P 7/00 | (2016.01) |
| H02P 3/00 | (2006.01) |
| H02P 6/12 | (2006.01) |
| H02P 1/04 | (2006.01) |
| H02H 7/08 | (2006.01) |
| H02H 5/04 | (2006.01) |
| H02H 3/24 | (2006.01) |
| H02H 3/20 | (2006.01) |
| G05D 23/00 | (2006.01) |
| H02H 9/04 | (2006.01) |
| H01H 47/00 | (2006.01) |
| H01H 51/30 | (2006.01) |
| G05B 5/00 | (2006.01) |

(52) U.S. Cl.
CPC ............ *G05D 23/00* (2013.01); *H01H 47/00* (2013.01); *H01H 51/30* (2013.01); *H02H 3/20* (2013.01); *H02H 3/24* (2013.01); *H02H 5/04* (2013.01); *H02H 7/08* (2013.01); *H02H 9/04* (2013.01); *H02P 1/04* (2013.01); *H02P 3/00* (2013.01); *H02P 6/12* (2013.01); *H02P 7/00* (2013.01); *H02P 23/12* (2013.01)

(58) Field of Classification Search
CPC .. H02H 5/04; H02H 7/08; H02H 3/20; H02H 3/24; H02H 9/04; G05B 5/00; G05D 23/00; H01H 47/00; H01H 51/30; B60S 1/08; B60S 1/0818; B60S 1/0822; B60S 1/0862; B60S 1/0896; B60S 1/087; B60S 1/481; B60S 1/482

See application file for complete search history.

(56) References Cited

U.S. PATENT DOCUMENTS

| | | | |
|---|---|---|---|
| 2005/0274398 A1* | 12/2005 | Fonville | B60S 1/482 134/34 |
| 2012/0259518 A1* | 10/2012 | Zimmer | B60S 1/08 701/49 |
| 2012/0266404 A1* | 10/2012 | Braun | B60S 1/0814 15/250.12 |
| 2013/0018546 A1* | 1/2013 | Zimmer | B60S 1/0896 701/36 |
| 2015/0353058 A1* | 12/2015 | Ernst | B60S 1/0862 134/18 |

FOREIGN PATENT DOCUMENTS

| | | | |
|---|---|---|---|
| DE | 9402090 | 6/1994 | |
| DE | 102006061631 | 7/2008 | |
| DE | 102010055361 | 8/2011 | |
| FR | 2789034 | 8/2000 | |
| WO | WO-2011076460 A1 * | 6/2011 | ................ B60S 1/08 |
| WO | WO-2011079990 A1 * | 7/2011 | ............ B60S 1/0896 |

OTHER PUBLICATIONS

DE102010055361A1, Aug. 25, 2011, Renz et al. Machine Translation from Espacenet.*
DE9402090U1, Jun. 9, 1994, Theuerkauf et al. Machine Translation from Espacenet.*
DE102006061631A1, Jul. 3, 2008, Zimmer Joachim; Machine Translation from Espacenet.*
International Search Report for Application No. PCT/EP2013/076105 dated Feb. 4, 2014 (English Translation, 3 pages).

* cited by examiner

WIPER DEVICE AND METHOD FOR CONTROLLING SAME

BACKGROUND OF THE INVENTION

There is already a known method for controlling a wiper device by means of a control and/or regulating unit. Such methods are especially used in motor vehicles in order to wipe vehicle windscreens conveniently. The control and/or regulating unit can undertake functions here that operate at least partly automatically, such as in particular interval wiping functions, adjustments of a wiper speed and/or the application of washing water to the vehicle windscreen and then distribution by limited interval wiping. It is also known to couple the control and/or regulating unit to a rain sensor that determines a vehicle windscreen coverage parameter and controls the wiper device depending upon said coverage parameter.

SUMMARY OF THE INVENTION

The invention is based on a method for controlling a wiper device by means of a control and/or regulating unit.

It is proposed that at least one operating parameter is set depending on at least one parameter that is different from a vehicle windscreen coverage parameter, whereby the wiping behavior can advantageously be adapted to ambient conditions and/or vehicle settings. Furthermore, a particularly good wiping result can be achieved with low consumption of washing water. In this context a "wiper device" shall mean in particular a device that is provided to wipe a pane of glass, in particular a vehicle windscreen. For this the wiper device in particular comprises at least one control and/or regulating unit, at least one wiper actuator, at least one washing water pump, at least one washing water nozzle, at least one wiper arm and/or at least one wiper blade. The wiper device is in particular at least partly disposed in a motor vehicle, in particular on a motor vehicle body. In this context it is in particular conceivable to use the wiper device for wiping a front and/or a rear screen. A "control and/or regulating unit" shall in particular be understood to be a unit with at least one controller. A "controller" shall in particular be understood to be a unit with a processor unit and with a memory unit as well as with an operating program stored in the memory unit. In principle, the control and/or regulating unit can comprise a plurality of interconnected controllers, which are preferably provided to communicate with each other by means of a bus system, such as in particular a CAN bus system. In this context an "operating parameter" shall in particular be understood to be a parameter that is set by the control and/or regulating unit and that comprises at least one item of operating information of at least one wiping process. An operating parameter comprises in particular at least one item of information about a wiping speed, a wiping interval time, a maximum torque, a total wiping running time, a quantity of washing water and/or a washing water pressure. In this context a "vehicle windscreen coverage parameter" shall be understood to mean in particular a parameter that describes a degree of coverage, for example by rain water, snow and/or dirt, on a vehicle windscreen. In particular, a vehicle windscreen coverage parameter shall be understood to mean a parameter determined by a rain sensor. In this context a "parameter" shall be understood to mean in particular a value that describes an ambient condition and/or a vehicle condition. In particular, the parameter describes an external temperature, an ambient brightness, a geographical vehicle position, a speed of travel, an occurrence of insects and/or date and/or time information. In particular, the at least one operating parameter is set partly automatically or preferably fully automatically depending on the at least one parameter that is different from the vehicle windscreen coverage parameter, in particular without intervention by a user. "Provided" shall in particular be understood to mean specially programmed, configured and/or furnished.

In a further embodiment of the invention it is proposed that the at least one operating parameter is set depending on at least one external temperature, whereby the wiping behavior can advantageously be adapted to different external temperatures. In this context an "external temperature" shall be understood in particular to mean an external temperature outside a motor vehicle on which the wiper device is disposed. In this context it is also conceivable that the external temperature is formed by a mean value of a plurality of external temperatures, in particular of different temperature sensors.

Furthermore, it is proposed that a winter program is activated when the at least one external temperature falls below a first temperature limit, whereby the wiping behavior can advantageously be adapted to winter conditions. In this context a "temperature limit" shall be understood to mean in particular a set temperature limit value that forms a switching point, in particular of the control and/or regulating unit. In this context a "winter program" shall be understood to mean in particular a data record that comprises in particular at least one operating parameter that is suitable for carrying out a wiping process in winter conditions.

Furthermore, it is proposed that the first temperature limit has a value of no more than 4° C., whereby advantageously a risk of frost during wiping can be taken into account. The first temperature limit preferably has a value between −6° C. and 4° C., more preferably between −2° C. and 2° C.

The wiping behavior can advantageously be adapted to autumnal and/or springlike weather conditions if a transition program is activated when at least one external temperature falls below a second temperature limit. In this context a "transition program" shall be understood to mean in particular a data record that in particular comprises at least one operating parameter that is suitable for carrying out a wiping process in autumnal and/or springlike conditions.

The wiping behavior can advantageously be adapted to summer weather conditions if a summer program is activated when the temperature exceeds a second temperature limit. In this context a "summer program" shall in particular be understood to mean a data record that in particular comprises at least one operating parameter that is suitable for carrying out a wiping process under summer conditions.

A particularly simple specification of a suitable operating program can be achieved, in particular for a transition program and/or a summer program, if the second temperature limit has a value between 6° C. and 14° C.

Washing water can advantageously be saved if the at least one operating parameter is taken into account when applying washing water. In this context "washing water" shall be understood in particular to mean a suitable liquid for washing and/or cleaning a vehicle windscreen, such as in particular water, alcohols or mixtures that comprise a water component and/or an alcohol component.

Particularly precisely execution of a wiping process can be achieved if the application of washing water is controlled by means of at least one wiping angle limit. In this context a "wiping angle limit" shall be understood to mean in particular an angle that forms a switching point, in particular of the control and/or regulating unit. In the event of a wiper blade exceeding or falling below the wiping angle limit, in particular the application of washing water will be activated or deactivated. Furthermore, it is conceivable that a washing water pressure is varied on exceeding or falling below the wiping angle limit. Furthermore, the application of washing water is advantageously controlled by means of at least one lead time that elapses before a wiper blade movement.

In a further embodiment of the invention it is proposed that the at least one wiping angle limit is set depending on the at least one operating parameter, whereby a particularly simple adjustment of the quantity of washing water can be carried out.

Furthermore, it is proposed that the wiper device be protected against overloading with an overload protection means, whereby damage to the wiper device in the event of an overload, for example by snow and/or ice, can be protected against. In this context it is in particular conceivable that the wiper device is advantageously returned to an initial position or retained in a current position for a defined time in the event of triggering of the overload protection means, so that a cause of the overload situation can be eliminated.

Particularly reliable protection against damage can be achieved if the overload protection means is triggered when a torque of the wiper device at least exceeds a maximum torque. In this context the torque can in particular be determined by means of a control current of a wiper actuator and/or by means of a torque sensor.

A particularly precise determination of an overload situation can be achieved if the at least one maximum torque is set depending on the at least one operating parameter. The maximum torque in a winter program preferably has an at least partly lower value than in a transition program and/or a summer program. Furthermore, the maximum torque also advantageously has a lower value in a transition program than in a summer program.

If the at least one maximum torque is set depending on a wiper position angle, determination of an overload situation can be more precise. In particular, the maximum torque describes a curve that approximates to a standard torque curve. The standard torque curve describes a normal torque profile that is to be expected with which a wiper blade will be pivoted about a drive axle.

If the at least one operating parameter is set depending on at least one item of date information, seasonal factors such as in particular leaves or high speeds of travel during the wiping process can be taken into account.

A wiping process can be adapted to geographical conditions if the at least one operating parameter is set depending on at least one latitude. Furthermore, the at least one operating parameter is advantageously set depending on at least one longitude. In this context it is also conceivable to take an altitude above mean sea level into account. The geographical position can advantageously be determined at least partly by means of a satellite-based position system and/or a barometric altitude sensor. In an additional embodiment it is proposed that the geographical position is transmitted by a separate navigation system that is in particular permanently installed in a motor vehicle. In this context it is conceivable to transfer a position data transmission by means of an existing bus system, such as in particular by means of a CAN bus system.

If the at least one operating parameter is set depending on at least one ambient brightness, visibility can be taken into account in the wiping process. For example, a quantity of washing water can be reduced at night in order to ensure good visibility. It is also conceivable that the at least one operating parameter is set depending on dazzling by the oncoming traffic. Furthermore, it is conceivable that the operating parameter is set depending on the occurrence of insects, in particular of mosquitoes.

The ingress of washing water into a passenger compartment can advantageously be prevented if the at least one operating parameter is set depending on a passenger compartment open state. In this context a "passenger compartment open state" shall be understood in particular to mean a state in which a passenger compartment is open to the surroundings. In particular, the passenger compartment open state comprises an item of information about opened window panes, opened doors, opened sliding roof windows and/or an opened cabriolet roof. If the passenger compartment is opened, a quantity of washing water can be reduced. It is also conceivable that the at least one operating parameter is set depending on an air humidity.

A wiper device with at least one control and/or regulating unit is also proposed, wherein the control and/or regulating unit is provided to set at least one operating parameter depending on at least one parameter different from a screen coverage parameter, whereby a wiping process can advantageously be adapted to ambient conditions and/or vehicle settings.

Advantageously, the wiper device comprises at least one wiper actuator that is provided to be controlled by the control and/or regulating unit, whereby a simple wiper blade drive can be achieved. The wiper actuator is preferably electrically driven.

In a further embodiment it is proposed that the wiper device comprises at least one washing water pump that is provided to be controlled by the control and/or regulating unit, whereby a quantity of washing water can be precisely applied to a vehicle windscreen. The washing water pump is preferably electrically controllable.

It is additionally proposed that the wiper device comprises at least one wiper arm. Furthermore, the wiper device advantageously comprises at least one wiper blade, in particular a joint-free wiper blade without joints that is provided to be connected to at least one wiper arm.

The wiper device according to the invention shall not be limited hereby to the application and embodiment described above. In particular, the wiper device according to the invention can comprise a different number than the number of individual elements, components and units mentioned herein in order to carry out a manner of operation that is described herein.

BRIEF DESCRIPTION OF THE DRAWINGS

Further advantages are revealed by the following description of figures. An exemplary embodiment of the invention is shown in the figures. The figures, the description and the claims contain numerous features in combination. The person skilled in the art will also appropriately consider the features individually and combine the same into further useful combinations.

In the figures.

DETAILED DESCRIPTION

Figure 1:
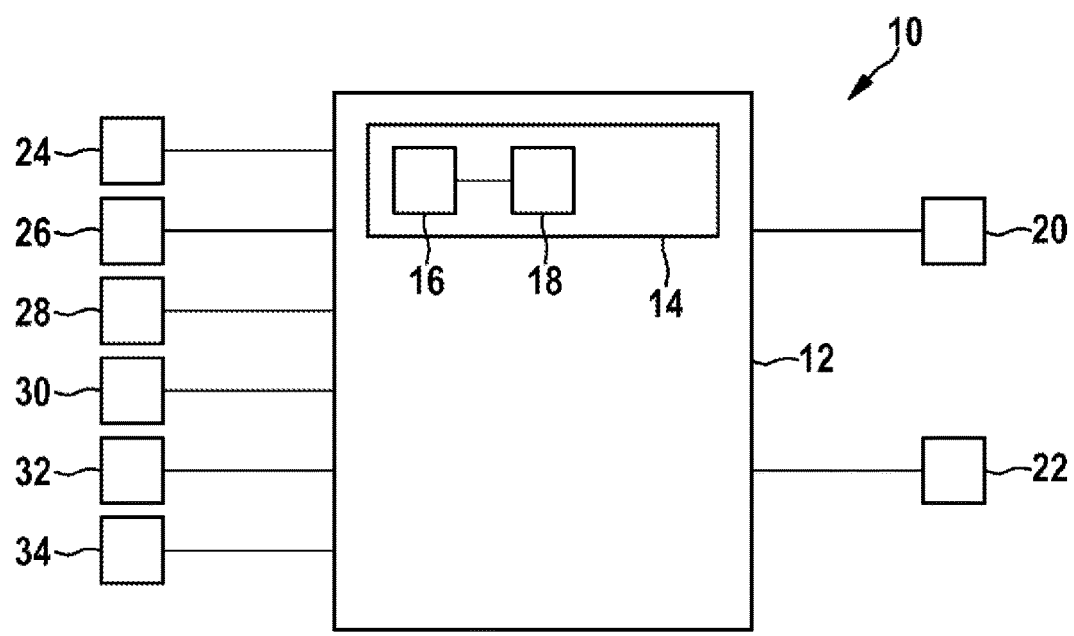
FIG. 1 shows a schematic structure of a wiper device according to the invention.
Figure 2:
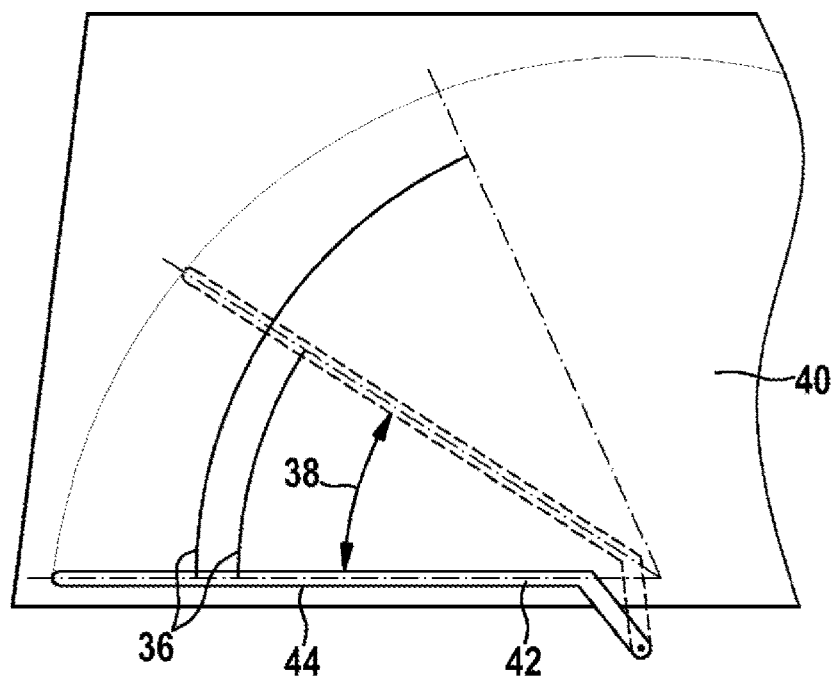
FIG. 2 shows a sub region of a vehicle windscreen with a wiper blade and a wiper arm in a plan view.

In FIG. 1 a structure of a wiper device 10 according to the invention is shown schematically. The wiper device 10 is provided for cleaning a vehicle windscreen 40 of a motor vehicle that is represented in FIG. 2. In this case the vehicle windscreen 40 is disposed in a front or rear region of the motor vehicle. To clean the vehicle windscreen 40 the wiper device 10 is provided on the one hand for purely mechanical wiping and also for mechanical wiping with the additional application of washing water.

The wiper device 10 shown in FIG. 1 comprises a control and/or regulating unit 12, which is referred to in the following claims simply as a "control unit". The control and/or regulating unit 12 comprises a controller 14 comprising a processor unit 16 and a memory unit 18 as well as an operating program stored in the memory unit 18.

The wiper device 10 also comprises a wiper actuator 20 that is controlled by the control and/or regulating unit 12. Control of the wiper actuator 20 takes place electrically in this case. In this context, however, it is also conceivable to control the wiper actuator 20 pneumatically and/or hydraulically. The wiper actuator 20 is formed by an electric motor that is coupled by means of a gearbox unit that is not described in detail to a wiper arm 42 that is shown in FIG. 2. A joint-free wiper blade 44 is reversibly connected to the wiper arm 42.

The wiper device 10 also comprises a washing water pump 22 that is controlled by the control and/or regulating unit 12. The washing water pump 22 is electrically controllable. In this context, however, it is also conceivable that the washing water pump 22 is designed to be pneumatically and/or hydraulically controllable. In an operating state the washing water pump 22 transports washing water from a washing water tank that is not shown to washing water nozzles. The washing water emanates from the washing water nozzles and passes to the vehicle windscreen 40 that is to be wiped by the wiping device 10. A delivery rate of the washing water pump 22 can be adjusted by means of current and/or voltage regulation.

The control and/or regulating unit 12 is coupled to a bus system 24 by means of which data can be exchanged with other bus subscribers. Operating parameters or operating parameter programs that contain operating parameters are stored in the memory unit 18. In this case the operating parameters or the operating parameter programs contain operating information about wiping speeds, wiping interval times, maximum torques, a total wiper running time, amounts of washing water and washing water pressures. In this context it is conceivable to store further operating information that appears useful to the person skilled in the art in operating parameters or operating parameter programs. The operating parameters are essentially used as reference values or as target values. In addition the operating parameters can be varied or adjusted. Adjustment of the operating parameters takes place fully automatically by means of the control and/or regulating unit 12 depending on a plurality of parameters different from the vehicle windscreen coverage parameters.

In order to detect a first parameter an external temperature sensor 26 is connected to the control and/or regulating unit 12. The external temperature sensor 26 thereby detects an external temperature outside a motor vehicle on which the wiper device 10 is disposed. The external temperature forms the first parameter that is transmitted to the control and/or regulating unit 12. It is conceivable that the external temperature sensor 26 comprises a plurality of temperature sensors that are disposed at different locations of the motor vehicle, such as in particular in a region close to the ground and/or on a vehicle roof. In this context it is also conceivable to analyze an external temperature from at least one temperature sensor that is already present and connected to the bus system 24. Depending on the application, an external temperature can thus also continue to be determined by the control and/or regulating unit 12 and to be taken into account for the adjustment of operating parameters in the event of a fault condition or elimination of the external temperature sensor 26.

In addition, a date generator 28 is provided that is connected to the control and/or regulating unit 12. The date generator 28 determines the current date, for example by means of a radio transmission, and transmits a second parameter that comprises the item of date information to the control and/or regulating unit 12. In this context it is also conceivable to analyze an item of date information from date generators that are already present and connected to the bus system 24, such as in particular a navigation system. Depending on the application, an item of date information can thus also continue to be determined by the control and/or regulating unit 12 and to be taken into account for the adjustment of operating parameters in the event of a fault condition or elimination of the date generator 28. In addition, it is conceivable in principle to provide a time of day generator in order to transfer a time of day to the control and/or regulating unit 12.

Furthermore, a brightness sensor 30 is connected to the control and/or regulating unit 12 for detecting an ambient brightness. In this case the brightness sensor 30 detects a brightness outside the motor vehicle on which the wiper device 10 is disposed and transmits a third parameter comprising the brightness to the control and/or regulating unit 12. It is conceivable that the brightness sensor 30 comprises a plurality of brightness sensing devices that are disposed at different locations of the motor vehicle. In this context it is also conceivable to analyze a brightness from already present brightness sensors that are connected to the bus system 24. Depending on the application, in the event of a fault condition or the elimination of the brightness sensor 30 a brightness can thus also continue to be determined by the control and/or regulating unit 12 and to be taken into account for the adjustment of operating parameters.

Furthermore, a position sensor 32 is connected to the control and/or regulating unit 12 for determining a geographical condition. The position sensor 32 comprises a GPS receiver. The position sensor 32 detects position data of the current location containing a longitude, a latitude as well as an altitude above mean sea level. A fourth parameter comprising the position data is transmitted to the control and/or regulating unit 12. In this context it is also conceivable to analyze position data from an already present position sensor that is connected to the bus system 24, such as for example a navigation system that is permanently installed in a motor vehicle. Depending on the application, a current location can thus also continue to be determined by the control and/or regulating unit 12 and to be taken into account for the adjustment of operating parameters in the event of a fault condition or elimination of the position sensor 32. In addition, it is conceivable to connect a barometric altitude sensor for precise determination the altitude above mean sea level to the control and/or regulating unit 12.

Furthermore, a torque sensor 34 is connected to the control and/or regulating unit 12. The torque sensor 34 determines a current torque 46 that is being applied to a drive axle that is not shown in detail and about which the wiper arm 42 is pivotably mounted. The torque sensor 34 transmits a fifth parameter that comprises the current torque 46 to the control and/or regulating unit 12. In this context it is in particular also conceivable that a current torque 46 is determined from a measurement of a drive current of the wiper actuator 20.

The control and/or regulating unit 12 comprises tree operating parameter programs, in each of which adapted operating parameters are stored. More accurately, the control and/or regulating unit 12 comprises a winter program, a transition program and a summer program. If the external temperature falls below a first temperature limit, a winter program is activated by the control and/or regulating unit 12. The first temperature limit is 4° C. in this case. If the external temperature exceeds a second temperature limit, a winter program is activated by the control and/or regulating unit 12. The second temperature limit is 10° C. in this case. If the external temperature is between the first temperature limit and the second temperature limit, i.e. between 4° C. and 10° C., a transition program is activated by the control and/or regulating unit 12. In this context it is in principle also conceivable for specifying other values of the temperature limits to appear useful to the person skilled in the art. In principle, an operating parameter program can be activated at any point in time.

In an additional embodiment, other parameters can also be taken into account for the determination of at least one operating parameter or the operating parameter program. In particular, it is conceivable that the current date in combination with the current location is processed by the control and/or regulating unit 12 in order to select the most suitable operating parameter program. In doing so an operating parameter is set by the control and/or regulating unit 12 depending on a latitude. An operating parameter is also set by the control and/or regulating unit 12 depending on a longitude. Furthermore, an operating parameter is set by the control and/or regulating unit 12 depending on an altitude above mean sea level.

Furthermore, it is conceivable that the control and/or regulating unit 12 compares the current location with a map comprising information about local weather conditions and/or weather features.

An application of washing water is controlled by means of a wiping angle limit 36 and a washing water control parameter. In the event of a demand for washing water by means of the washing water parameter, the washing water pump 22 is initially controlled or activated by the control and/or regulating unit 12. Following a definable lead time, the wiper actuator 20 is activated by the control and/or regulating unit 12. A wiper position angle 38 describes the difference between an initial position and a current angle of the wiper arm 42 (FIG. 2). In the initial position the wiper position angle is 0°. The wiper arm 42 pivots from an initial position about the pivot axis, wherein the wiper position angle 38 increases. On exceeding the wiping angle limit 36 the washing water pump 22 is deactivated by the control and/or regulating unit 12.

The wiping angle limit 36 is set depending on an operating parameter. More accurately speaking, the wiping angle limit 36 is set depending on the operating parameter program. If the winter program is activated the wiping angle limit is 60°. If the transition program is activated the wiping angle limit is 30°. If the summer program is activated the wiping angle limit is 0°, whereby the washing water pump 22 is deactivated immediately after the lead time has elapsed. In principle, it is also conceivable that a washing water pressure is varied depending on the operating parameter program, wherein the washing water pressure is higher in the winter program than in the summer program. In this context it is also conceivable that the wiping angle limit 36 is set lower for darkness than for when nit is light. For this purpose the third parameter comprising the brightness is analyzed by the control and/or regulating unit 12. In addition, it is conceivable that the wiping angle limit 36 is adjusted to be lower in the event of dazzle from oncoming traffic than without dazzle. In this context it is also conceivable that the wiping angle limit 36 is adjusted to be higher in the event of a greater occurrence of insects than for without a greater occurrence of insects.

The wiping angle limit 36 is also adjusted depending on a passenger compartment open condition. If a passenger compartment that is not shown is open to the surroundings, the wiping angle limit 36 is reduced or set to 30°. In addition, in the event of high air humidity, in particular an air humidity greater than 90%, the wiping angle limit 36 is reduced or set to 30°.

The wiper device 10 is protected against overloading with an overload protection means. The overload protection means is partly implemented in the control and/or regulating unit 12. In this case the control and/or regulating unit 12 detects the fifth parameter that comprises the current torque 46 on the drive axle. The current torque 46 is compared with a maximum torque by the control and/or regulating unit 12. If the current torque 46 exceeds the maximum torque, the control and/or regulating unit 12 triggers an overload situation. The wiper arm 42 returns to the initial position in the event of triggering of the overload protection means, i.e. in the event of an occurrence of an overload situation.

Figure 3:
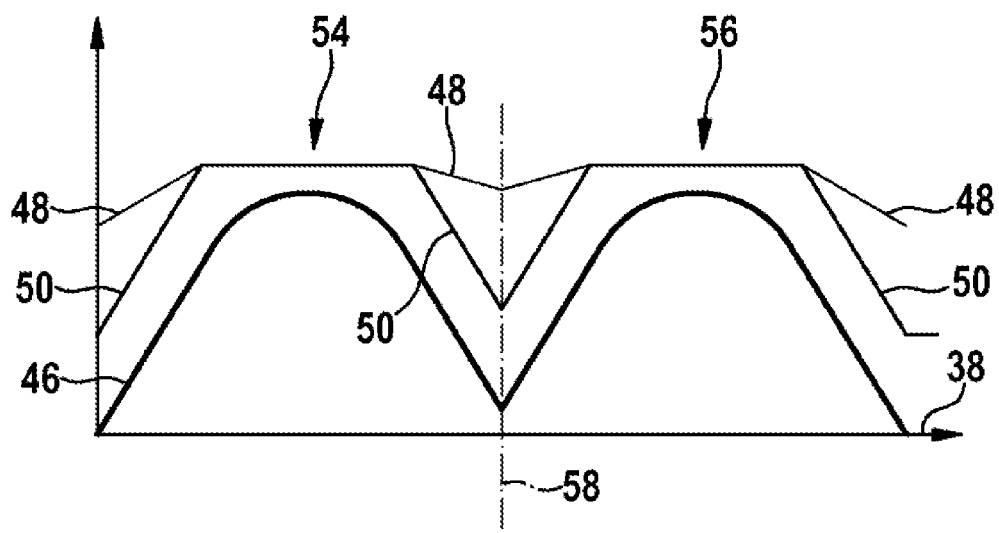
FIG. 3 shows a diagram of a torque profile without an overload situation and FIG. 4 shows a diagram of a torque profile with a possible overload situation.

FIG. 3 shows a normal torque profile during a wiping process, which can be described by two adjacent second order functions. In a first range of position angles 54 the wiper arm 42 moves out of a stowed position and into an airflow region that is not shown. The current torque 46 thus increases up to a maximum value. The current torque 46 then decreases and finally has a value of zero in an upper turning position 58. The wiper arm 42 is briefly stationary in the upper turning position 58. The wiper arm then returns to the stowed position in a second range of position angles 56, wherein the current torque 46 rises once again and finally falls to zero.

The maximum torque is set depending on the wiper position angle 38. The maximum torque of each phase of a wiping process is adjusted depending on the load to be expected. A first maximum torque curve 48 and a second maximum torque curve 50, which associate a maximum torque with each wiper position angle 38, are stored in the control and/or regulating unit 12.

The first maximum torque curve 48 has a higher maximum torque than the second maximum torque curve 50 and a slightly positive gradient until a first maximum value in the first range of position angles 54 is reached. In a region of the first maximum value of the current torque 46, the first maximum torque curve 48 and the second maximum torque curve 50 have the same value and a gradient of zero. The first maximum torque curve 48 then again has a higher maximum torque than the second maximum torque curve 50 and a slightly negative gradient until the upper turning position 58 in the first range of position angles 54 is reached.

Starting from the upper turning position 58, the first maximum torque curve 48 also has a higher maximum torque than the second maximum torque curve 50 and a slightly positive gradient until a second maximum value in the second range of position angles 56 is reached. In a region of the second maximum value of the current torque 46, the first maximum torque curve 48 and the second maximum torque curve 50 have the same value and a gradient of zero. The first maximum torque curve 48 then again has a higher maximum torque than the second maximum torque curve 50 and a slightly negative gradient until the stowed position in the second range of position angles 56 is reached. The different maximum torque curves 48, 50 thus only coincide in sub regions. Furthermore, it is also conceivable that the different maximum torque curves deviate from each other completely. In this context it is conceivable to store further maximum torque curves in the control and/or regulating unit 12.

If the winter program or the transition program is activated, the control and/or regulating unit 12 compares the current torque 46 with the second maximum torque curve 50. If the current torque 46 for a certain wiper position angle 38 is higher than the maximum torque for said wiper position angle 38, the control and/or regulating unit 12 triggers the overload situation and returns the wiper blade 44 or the wiper arm 42 to the initial position if possible. The maximum torque thus has a lower value in the winter program than in a summer program.

If the summer program is activated, the control and/or regulating unit 12 compares the current torque 46 with the first maximum torque curve 48. If the current torque 46 for a certain wiper position angle 38 is higher than the maximum torque for said wiper position angle 38, the control and/or regulating unit 12 triggers the overload situation and returns the wiper blade 44 or the wiper arm 42 back to the stowed position if possible.

In this context it is also conceivable to store a standard torque curve. The current torque 46 is compared with the standard torque curve by the control and/or regulating unit 12. If the current torque 46 is outside a tolerance band, the control and/or regulating unit 12 triggers the overload situation. A tolerance to be used depends on at least one parameter and/or on the activated operating program.

Figure 4:
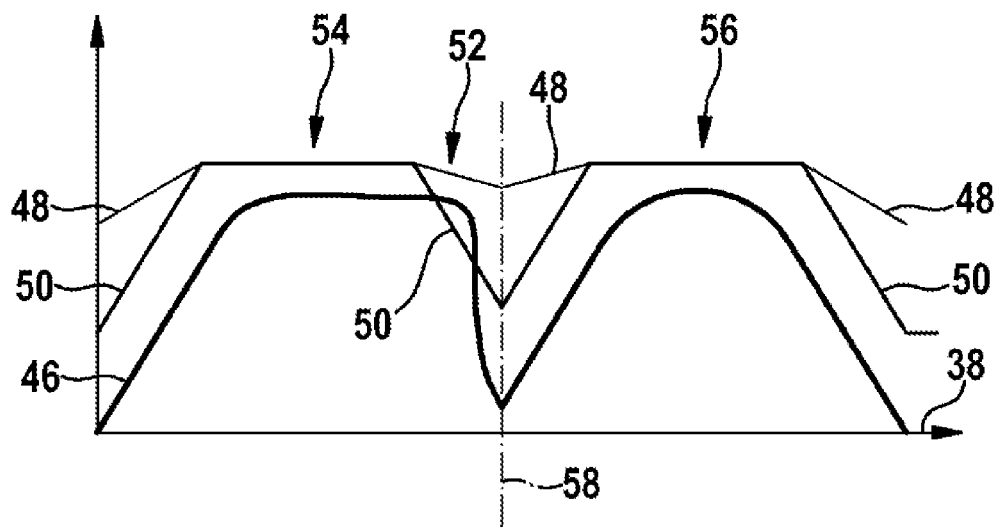

In FIG. 4 a torque profile is shown for which the current torque 46 in a region 52 deviates from a standard torque. In this case the deviation or the increased torque 46 can be caused for example by a high speed of travel, damage and/or a foreign body on the vehicle windscreen 40.

If summer program is active, in particular because of the external temperature and/or because of the current date, the control and/or regulating unit 12 compares the current torque 46 with the maximum torque in the relevant region 52 of the first maximum torque curve 48. Because the maximum torque in the region 52 is higher than the current torque 46, the control and/or regulating unit 12 does not trigger an overload situation since an increased torque 46 must be reckoned with because of a higher speed of travel, for example.

If the winter program or the transition program is active, in particular because of the external temperature and/or because of the current date, the control and/or regulating unit 12 compares the current torque 46 with the maximum torque in the relevant region 52 of the second maximum torque curve 50. Because the maximum torque in the region 52 is lower than the current torque 46, the control and/or regulating unit 12 triggers an overload situation since the increased torque can be explained because of the time of year with the increased probability of icing and/or snow, which must be removed manually.

The invention claimed is:

1. A method for controlling a wiper device (10), the method comprising:
   providing a control unit (12),
   using the control unit to set at least one operating parameter depending on at least one parameter that is different from a vehicle windscreen coverage parameter, wherein the at least one operating parameter that is set comprises at least one maximum torque provided from a torque profile; and a wiping angle limit that controls a quantity of washing water during application of the washing water, and the at least one maximum torque is set depending on a wiper position angle (38) and the parameter of at least one external temperature,
   using the control unit to protect the wiper device (10) against overloading in an event of a torque (46) of the wiper device (10) exceeding the at least one maximum torque by either returning a wiper arm of the wiper device to an initial position or retaining the wiper arm in a current position for a defined time, and
   activating or deactivating the application of the washing water when a wiper blade of the wiper arm exceeds or falls below said wiping angle limit.

2. The method as claimed in claim 1, characterized in that a winter program is activated in the event of the at least one external temperature falling below a first temperature limit.

3. The method as claimed in claim 1, characterized in that the at least one wiping angle limit (36) is set depending on whether a winter program or a summer program is activated, and wherein the maximum torque has a lower value in the winter program than in a summer program.

4. The method as claimed in claim 1, characterized in that the at least one maximum torque is set depending on at least one item of date information.

5. The method as claimed in claim 1, characterized in that the at least one operating parameter further comprises a washing water pressure, wherein the washing water pressure is varied depending on the wiper blade exceeding or falling below the wiping angle limit.

6. The method as claimed in claim 1, further comprising controlling the quantity of washing water depending on at least one ambient brightness.

7. The method as claimed in claim 1, wherein the quantity of washing water depends on a vehicle open condition.

8. The method as claimed in claim 2, characterized in that the first temperature limit has a value no greater than 4° C.

9. The method as claimed in claim 2, characterized in that a transition program is activated in the event of the at least one external temperature falling below a second temperature limit.

10. The method as claimed in claim 2, characterized in that a summer program is activated in the event of the at least one external temperature exceeding a second temperature limit.

11. The method as claimed in claim 9, characterized in that the second temperature limit has a value between 6° C. and 14° C.

\* \* \* \* \*